Feb. 4, 1958     R. J. INGHAM, JR     2,821,952
INDICATING INSTRUMENT WITH ADJUSTABLE SCALE
Filed Sept. 22, 1955     2 Sheets-Sheet 1

Inventor
Robert J. Ingham, Jr.
by Roberts Cushman Grover
Att'ys

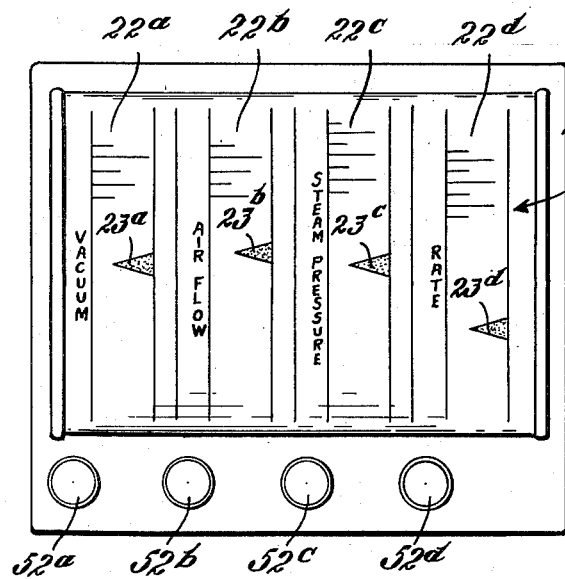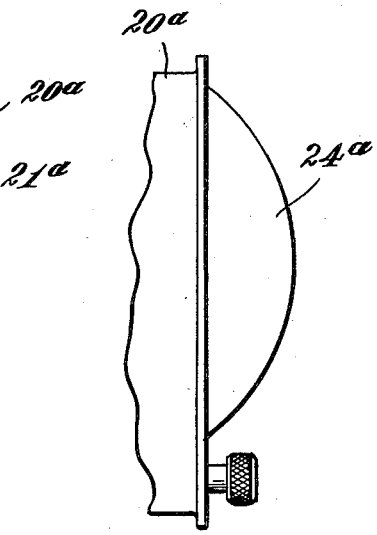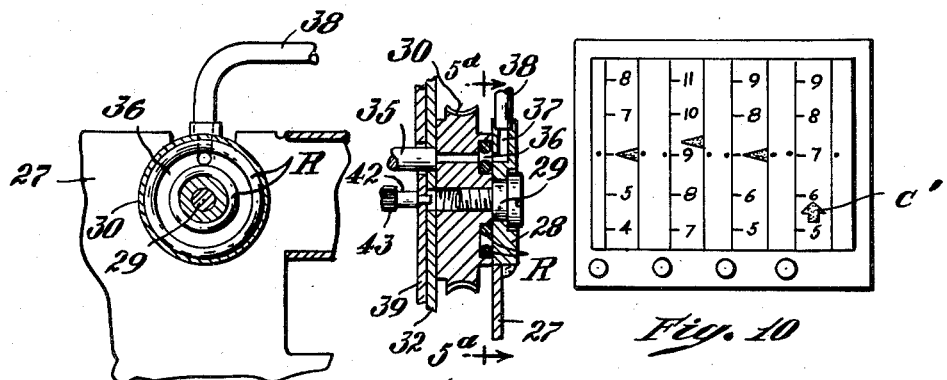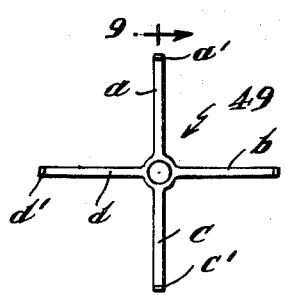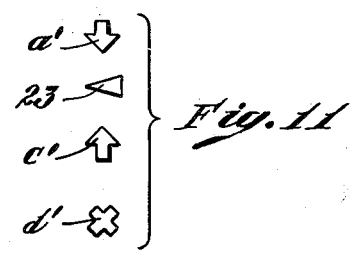

United States Patent Office 2,821,952
Patented Feb. 4, 1958

2,821,952
INDICATING INSTRUMENT WITH ADJUSTABLE SCALE

Robert J. Ingham, Jr., Fairfield, Conn., assignor to Manning, Maxwell & Moore, Incorporated, Stratford, Conn., a corporation of New Jersey Application September 22, 1955, Serial No. 535,803

7 Claims. (Cl. 116—129)

This invention pertains to indicating instruments of the kind wherein movable index means cooperates with a graduated scale to show variations in a certain physical condition, for instance fluid pressure or temperature. While of more general application, for instance in thermometry, the invention is herein specifically described, for convenience and by way of useful example but not in limitation, as embodied in a pressure gauge wherein the series of graduations of the scale which at any given time is visible to the observer extends substantially vertically.

For certain purposes, the scale of an indicating instrument must necessarily cover a very extended range, with the result that the scale as a whole may be of considerable length. However, limitations of available space often preclude the use of a fixed scale of the required length, and the present invention relates to an instrument so devised as to make possible the employment of a long range scale of good visibility but so designed that the instrument occupies relatively small space.

Although the total range of such an instrument may be very substantial, thus requiring an extended scale, it is quite commonly found, under normal operating conditions, that only a relatively short portion of the scale is actually in use, such limited portion more often than not being located at the mid-portion of the length of the scale. To avoid error and to facilitate observation it has been proposed to provide means for masking from view those portions of the scale which are seldom in use, for instance, by arranging an opaque screen or its equivalent in front of the scale and to provide such masking means with a window or sight opening of such dimensions lengthwise of the scale as to exhibit only that portion of the length of the scale which is most often in use.

However, such an arrangement has the disadvantage that if, at any time, the index means, for instance a movable pointer, move beyond the confines of the window, it is no longer visible and the observer has no means of knowing where it is located or in what direction it was moving when it passed behind the masking screen. When, as is sometimes practiced, a plurality of such instruments are arranged in a row and in juxtaposition with their scales parallel, for example, for simultaneously indicating existing conditions at various stages of a continuous chemical process or the like, it would be of assistance to the observer if the pointers of the several instruments (when the conditions indicated by the several instruments are normal) could be located at approximately the same distance from or in accordance with a definite pattern relatively to a given horizontal line, for instance, the horizontal midline of the exposed portions of the several scales so that, at a glance, the observer could note any unusual condition by the deviation of a given pointer from the pattern. However, if the several scales are similarly graduated, the pointers (under normal operating conditions) may be so widely spaced in a vertical direction that only by careful observation and reading of the respective scales can it be determined that any one pointer is abnormally positioned.

The present invention has for an object the provision of an instrument of the class described having a scale whose graduations are sufficiently spaced to insure good visibility and which is designed to cover a wide range, but wherein the instrument as a whole occupies relatively little space. A further object is to provide an instrument of the above type wherein the scale is formed on the circumferential surface of a cylindrical support or drum having its axis horizontal. A further object is to provide an instrument of the class described, wherein index means moves relatively to a graduated scale and wherein only a predetermined limited portion of the scale is visible at any given time, the remainder of the scale being hidden from view by masking means, and so devised that, by simple manipulation, the index means and that portion of the scale with which it is in registry at any given time may be brought into view but without moving the index means relatively to the scale. A further object is to provide an instrument having the characteristics just above referred to and having means operative to indicate the location of the index means if the latter be hidden by the masking means. A further object is to provide an instrument such as just described having means to indicate the direction in which the index means moved from visible location into concealment behind the masking means, as well as the approximate distance of the index means from its normal position of visibility.

A further object is to provide a composite instrument comprising a row of parallel scales each with its respective pointer, and independent means for moving the individual pointers, and comprising means, such that, although the several pointers would, under normal operating conditions, be located at different distances from the zero ends of their respective scales, they may be so relatively shifted, without moving them relatively to their respective scales, that they are all disposed in accordance with a predetermined pattern with reference to a given datum line.

A further object is to provide a compound instrument comprising a row of parallel, vertical, graduated scales, each with its respective pointer and each having its individual motor for moving its pointer, and wherein only a predetermined portion of each respective scale is visible at any one time, the remainder of the scale being hidden by masking means, and wherein the several scales are similarly graduated and wherein the several pointers, under normal operating conditions, may be located at different distances from the zero end of the respective scales, with provision for so relatively shifting the several scales, without moving any pointer relatively to its corresponding scales, as to locate all of the pointers so that they are visible and in an approximately horizontal row. Other and further objects and advantages of the invention will be pointed out in the following more detailed description and by reference to the accompanying drawings, wherein Fig. 1 is a front elevation of an instrument embodying the broad features of the invention, said instrument having a single graduated scale and pointer;

Fig. 5 is a fragmentary section, to larger scale, on the same plane as Fig. 3;

Fig. 5ª is a fragmentary vertical section substantially on the line 5ª—5ª of Fig. 5, showing the pivotal support for the motor means, and the seal between rotary and stationary parts;

Fig. 6 is a diagrammatic front elevation similar to

Figure 1:
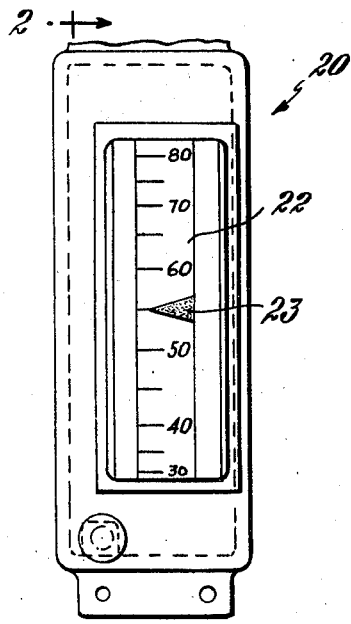

Fig. 1, but showing a composite instrument having a plurality of scales and corresponding pointers;

Fig. 7 is a fragmentary side elevation of the instrument of Fig. 6;

Fig. 8 is a front elevation of an index carrying spider such as is desirably employed in the instrument;

Fig. 9 is a section on line 9—9 of Fig. 8;

Fig. 10 is a diagrammatic front elevation of the instrument of Fig. 6, but with the right-hand pointer out of sight, and with an indicator positioned to indicate the direction in which the pointer passed from view, and Fig. 11 is a composite view illustrating various types of indicator which may be employed.

Figure 2:
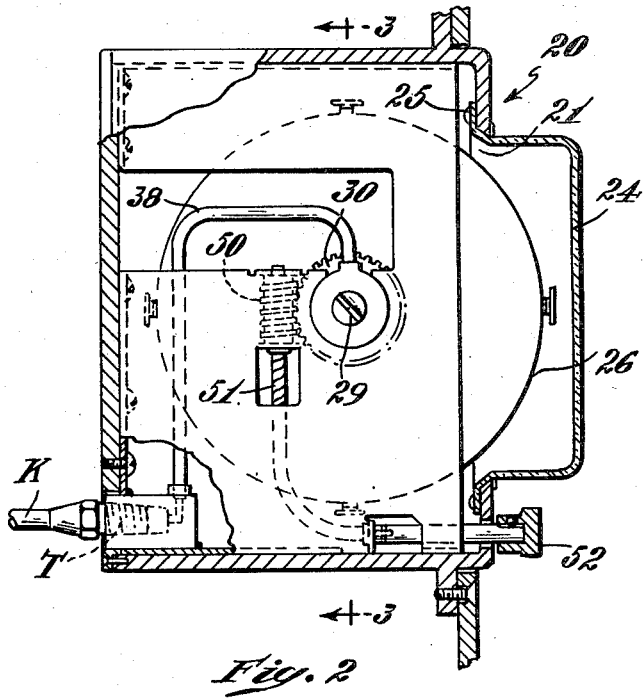
Fig. 2 is a fragmentary section substantially on the line 2—2 of Fig. 1.
Figure 3:
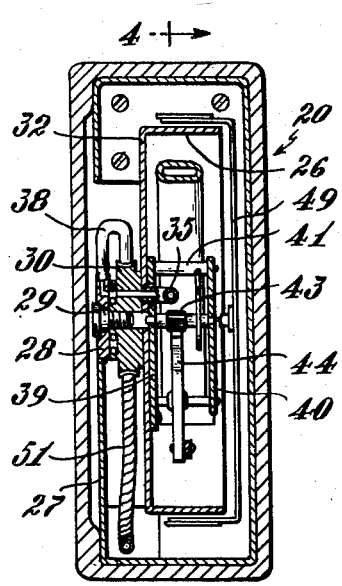
Fig. 3 is a vertical section substantially on the line 3—3 of Fig. 2.

Referring to the drawings, the numeral 20 indicates the case of the instrument, this case being here shown as of generally rectangular contour, and being of an appropriate material, for example sheet metal or a suitable shape-retaining plastic. At its front the case is provided with a sight opening or window 21 (Fig. 2), here shown as vertically elongate and through which is exhibited the graduated scale 22 (Fig. 1) and the pointer 23 which is movable relatively to the scale. As shown in Fig. 2, the sight opening or window is protected by a transparent shell 24, which may be of glass or a transparent plastic and which is provided with a bordering flange 25, by means of which it is secured to the front wall of the case proper at the margins of the sight opening. The graduated scale 22 is formed on the peripheral surface of a cylinder or drum 26. A bracket 27 (Fig. 3) is disposed against the inner surface of the casing, being fixed in place in any appropriate way, for example by screws. This bracket has an opening in which is fixed a bearing block 28 (Figs. 3 and 5) which forms a bearing for a rotatable, shouldered screw 29, which forms a pivotal support for the rotatably adjustable structure about to be described. This rotatable structure comprises the worm wheel 30, having a central portion which is provided with a screw-threaded bore which receives the screw-threaded shank of the pivot screw 29, this screw being screwed into the bore in the worm wheel and tightened so that the worm wheel and screw turn as a unit. To the left-hand face of the worm wheel, as viewed in Fig. 5, there is fixedly secured a plate 32 carrying a block 33 (Fig. 4) to which the fixed end of a Bourdon tube 34 is secured. The block 33 has a cavity at its interior with which the Bourdon tube communicates and from this cavity extends a tube 35 which leads to an annular chamber 36 (Fig. 5) in the face of the control part of the worm wheel 30. Within this annular space two concentric spaced O-rings R are arranged, the tube 35 communicating with the space between these rings. The fixed bearing block 28 is provided with a passage 37 (Fig. 5) whose inner end opens into the space between the O-rings in the chamber 36. A conduit 38 leads from a socket T (Fig. 2) in the wall of the case to the passage 37. A pipe K leads from the source of variable pressure, whose fluctuations are to be indicated by the instrument, to the socket T. The arrangement of the parts just described provides for uninterrupted, leak-proof communication between the supply pipe K and the Bourdon tube, regardless of the position to which the worm wheel 30 may be rotated. The pivot screw 29 is coaxial with the drum 26, above referred to. To the right-hand side (Fig. 3) of the plate 32 there is secured the movement frame of a conventional Bourdon tube, this frame comprising the parallel plates 39 and 40 connected by the rigid posts 41. The plates 39 and 40 provide bearings for a staff 42 (Fig. 5) which is coaxial with the pivot screw 29, and on which is fixed a pinion 43 which meshes with a segmental gear 44 (Fig. 4), which is supported to swing, as is customary in such devices, about an axis parallel to that of the staff 42. A hair spring 45 tends to turn the staff 42 in one direction. Movement in the opposite direction is imparted by the segmental gear 44 (Fig. 4), which has an arm 47 connected by a link 46 to the free end or tip of the Bourdon tube 34. The plate 32, above referred to, forms the head of the drum 26, which is provided with the graduated scale 22. The staff 42 passes through a central opening in the plate 39 and extends beyond the plane of the right-hand edge of the drum, as viewed in Fig. 3. To the right-hand end of this staff 42 there is secured a spider 49, usually of metal, here shown (Figs. 4, 8 and 9) as comprising four arms a, b, c, d, each arm being provided at its outer end with an indicator element which overlaps the peripheral surface of the drum 26 for cooperation with the graduated scale on the surface of the drum. One of these indicator elements, for example the one carried by the arm b is the pointer 23, above referred to, this pointer being the index element which normally cooperates with the graduated scale 22 to indicate pressures (if, for example, the instrument is designed for indicating pressure variations). The indicator elements carried by the arms a, d and c are here designated by the characters a', d' and c' respectively, and are desirably distinguishable, for example by shape or color, from each other and from the pointer or indicator 23. Thus, for example as illustrated in Fig. 11, the indicator a' may be a downwardly pointing arrow; the indicator c' may be an upwardly directed arrow; and the indicator d' may be a cross-shaped figure. The purpose of these indicators will hereafter be more fully described.

As shown in Fig. 2, a worm 50 engages the worm wheel 30, this worm being mounted on a flexible shaft 51 which turns in suitable bearings, this shaft having a knob 52 projecting from the front of the case, by means of which the worm 50 may be turned, thereby to turn the worm wheel and the structure mounted on the latter.

Referring to Figs. 6 and 7, there is illustrated a composite instrument which, in substance, comprises a plurality of instruments, such as that above described, but arranged in juxtaposition. While here shown as disposed in a horizontal row, it is obvious that they could be arranged in a vertical row. If desired, the operative parts of the several instruments may be housed within a single case. Thus, as shown in Fig. 6, the case 20ᵃ is elongate horizontally and is provided with a sight opening or window 21ᵃ of a width horizontally to exhibit a plurality of graduated scales arranged in parallel relation, four such scales, indicated by the characters 22ᵃ, 22ᵇ, 22ᶜ and 22ᵈ respectively, being shown in Fig. 6. In this particular embodiment of the invention the transparent shell or panel 24ᵃ (Fig. 7), which protects the sight opening or window, is cylindrical, curved concentrially with the drums. Within this case is a row of coaxial drums, the peripheral surfaces of which bear the scales 22ᵃ, 22ᵇ, etc., with pointers 23ᵃ, 23ᵇ, 23ᶜ and 23ᵈ respectively, arranged to cooperate with the respective scales. It will be understood that each pointer is actuated through a corresponding movement mechanism by means of its individual pressure motor, for example a Bourdon tube, such as above described, and that each such movement mechanism, together with its motor, the associated graduated drum and the corresponding pointer is mounted in the manner above described for rotation about a common axis, that is to say, the axis of the several drums. Each of the respective worm wheels, not shown in Figs. 6 and 7 but which correspond to the worm wheel 30 of Fig. 3, may be rotated by means of its own individual manually operable knob 52ᵃ, 52ᵇ, 52ᶜ and 52ᵈ, respectively. Such rotation of any knob turns the corresponding worm wheel and thus turns the movement mechanism, the Bourdon tube or other motor means, the corresponding drum and the corresponding pointer as a unit, so that, as viewed in Fig. 6, the pointer and scale, corresponding to that particular worm wheel, will move up or down in the sight opening but without relatively moving the pointer and its corresponding scale.

Figure 4:
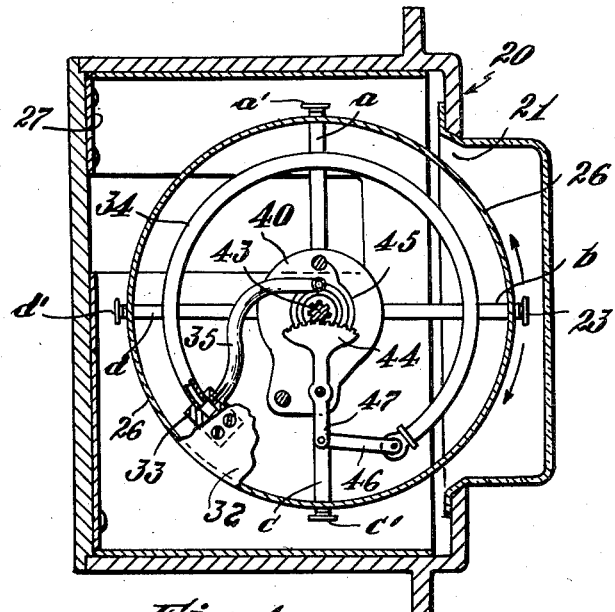
Fig. 4 is a vertical section on the line 4—4 of Fig. 3.

Reverting again to the single scale instrument (Fig. 4)

the sight opening 21, formed in the front wall of the case 20, is of a vertical extent such that approximately 90° of the circumference of the drum 26 is at any one time visible from the front of the case. Thus the pointer 23 may move through an arc of approximately 90° between the upper and lower limits of its visibility through the sight opening. However, if the pointer, in response to the operation of the Bourdon tube, should be moved more than 45° in either direction from the horizontal center line of the sight opening, the pointer will disappear from view, being located within the casing and masked from view by the casing, but by the use of the indicator-carrying spider 49, as shown in Figs. 4 and 9, the disappearance of the pointer 23 behind the front wall of the casing is accompanied by the appearance, within the sight opening, of either the indicator element $a'$ or the indicator element $c'$. If the element $a'$ appear in the upper part of the sight opening its downwardly directed arrow-shape would indicate to the observer that the pointer 23 has moved downwardly in disappearing from the sight opening. If the upwardly directed arrow-shaped indicator $c'$ appears in the sight opening, the observer will know that the pointer 23 has disappeared from view in moving upwardly beyond the sight opening. Moreover, by observing the graduations between the indicator elements $a'$ and $c'$ and that edge of the window opening at which the pointer 23 disappeared, the approximate distance to which the pointer 23 has moved beyond the edge of the sight opening may readily be ascertained.

If, as just suggested, under some conditions, the pointer 23 is found to have disappeared beyond the sight opening and if it be desirable that the observer know exactly the position of the pointer 23 relatively to its particular scale, the knob 52 may be turned, thus turning the worm wheel 30 and moving the entire unit including the motor means, the movement mechanism, the graduated drum and the pointer backwardly or forwardly so as to bring the pointer within the sight opening. Since this movement does not change the relative positions of the pointer and graduated scale, the pointer still indicates the proper reading, and this reading is observable through the sight opening. Thus, although the sight opening may restrict the normal length of the scale which is observable, it is possible (if, under certain conditions the pointer move beyond the sight opening) to return the pointer to a visible position, for example temporarily, merely to provide an instant reading if this is deemed necessary.

The arrangement as illustrated in Fig. 6 has a further advantage because it is possible, if desired, to adjust the several scales so that under proper operating conditions the several pointers $23^a$, $23^b$, etc. will be disposed, for example in a substantially straight row or at least in some definite pattern which is readily observable at a glance and without necessitating the reading of each individual scale, so that, so long as conditions remain substantially normal, the mere observation of the pattern presented by the several pointers will assure the observer that everything is proceeding properly. On the other hand, if after having adjusted the pointers in this manner, the observer should note that one of the pointers has moved substantially out of line or out of the proper pattern relatively to the other pointers, he will know instantly that in the particular to which that pointer relates the condition is not normal, even though he does not take time to observe the actual scale reading, and thus he can take the necessary steps to restore conditions to normal. Such a condition is illustrated in Fig. 10 where the pointer $23^d$ of Fig. 6 has passed from view, and its corresponding indicator $C'$ has appeared. Thus at a glance, the observer can see that an abnormal situation has developed in the process step to which pointer $23^d$ responds.

While the motor means here shown is a Bourdon tube, it will be obvious that any other motor means appropriate for use in the particular instrument may be employed, as, for further example a diaphragm, a metallic bellows, a bimetallic coil or column of expansible fluid.

While the mechanism hereinabove described is especially useful when the scale is of a length exceeding the height of the window or sight opening, it possesses utility even when the scale length is no greater than the height of the window opening, since it permits the user to locate the pointer, when indicating the normal working condition, at any selected position, vertically, of the window opening. This is of particular use, when a plurality of instruments are juxtaposed, in enabling the user to establish a desired pointer pattern.

Moreover, other means equivalent to the worm and wheel here shown for rotating the support on which the motor and scale are mounted may be used if desired, and likewise other means for indicating the position of the pointer beyond the visible portion of the scale may be utilized. All modifications and equivalents falling within the terms of the appended claims are to be regarded as within the purview of the invention.

I claim:

1. In combination, an indicating instrument wherein index means is moved along a graduated scale by motor means, a movable support for the motor means, scale and index means, fixed masking means operative to conceal all but a predetermined portion of the scale, means for moving the support to bring the index means and a concealed portion of the scale out of concealment if at any time the index means be located at said concealed portion, and means operative, when the index means is concealed by the masking means, to indicate the direction in which the support must be moved to bring the index means out of concealment.

2. In combination, an indicating instrument wherein index means is moved along a graduated scale by motor means, a movable support for the motor means, scale and index means, fixed masking means defining therein a sight opening and operative to conceal all but a predetermined portion of the scale, means for moving the support to bring the index means and a concealed portion of the scale out of concealment if at any time the index means be located at said concealed portion, and an indicator which comes into view at the sight opening as the index means leaves the sight opening, said indicator being so devised as to indicate the direction in which the moving index means receded from the sight opening.

3. In combination, in an indicating instrument of the kind wherein a rotatable part carries a graduated scale and a fixed part has a sight opening through which a portion of the scale is visible, the sight opening being of such dimensions that only a part of the length of the scale is visible therethrough at one time, a pointer-carrying part is moved by motor means relatively to the scale and a pointer is carried by said part, and wherein, at times, the pointer may register with a portion of the scale which is beyond the sight opening, indicator means operative automatically to show the direction of motion of the pointer in leaving the sight opening.

4. In combination, in an instrument according to claim 3, wherein the indicator means comprises parts bearing distinctive symbols and wherein one of said parts becomes visible at the sight opening as the pointer leaves the sight opening while moving in one direction, and another of said parts becomes visible at the sight opening when the pointer leaves the sight opening in the opposite direction.

5. In combination, in an instrument according to claim 3 wherein the pointer-carrying part has four arms spaced 90° apart, the arm which is opposite to the pointer-carrying arm bearing a symbol whose appearance at the sight opening indicates that the pointer has moved at least 135° beyond the limits of the sight opening.

6. In combination, in an instrument of the class described, a casing having a wall provided with a sight opening, a rotatable support within the casing arranged to turn about an axis which is parallel to that wall of the casing which is provided with the sight opening, a motor fixed to the support, a rotatable cylinder coaxial with the support and which has a graduated scale on its circumferential surface, a pointer-carrying part coaxial with the support and movable relatively to the latter, connections between the motor and said part whereby the latter may be moved relatively to the scale, a pointer carried by said part for cooperation with the scale, and means for moving the support thereby to move the motor, scale and pointer-carrying part as a unit and without relatively moving the scale and pointer, said pointer-carrying part being provided with a plurality of arms, on one of which the pointer is mounted and another of said arms carrying an indicator in cooperative relation to the scale and which appears at the sight opening if the pointer passes beyond the limits of the sight opening.

7. In combination, in an instrument of the class described, a casing having a wall provided with a sight opening, a rotatable support within the casing arranged to turn about an axis which is parallel to that wall of the casing which is provided with the sight opening, a motor fixed to the support, a rotatable cylinder coaxial with the support and which has a graduated scale on the circumferential surface, said sight opening exposing approximately 90 degrees of the circumference of said graduated cylinder, a pointer-carrying part coaxial with the support and movable relatively to the latter, connections between the motor and said part whereby the latter may be moved relatively to the scale, a pointer carried by said part for cooperation with the scale, and means for moving the support thereby to move the motor, scale and pointer-carrying part as a unit and without relatively moving the scale and pointer, said pointer-carrying part being provided with at least three arms spaced approximately 90 degrees apart, one of said arms carrying the pointer, and the arms, at opposite sides of the pointer-carrying arm, carrying indicator elements in cooperative relation to the scale, one or the other of said indicating elements appearing at the sight opening if the pointer passes beyond the limits of the sight opening in one direction or the other respectively.

References Cited in the file of this patent
UNITED STATES PATENTS
2,464,190   Lian-Tong Wen _____ Mar. 8, 1949